United States Patent [19]

Perrin

[11] Patent Number: 4,615,566
[45] Date of Patent: Oct. 7, 1986

[54] BRAKING CORRECTOR

[75] Inventor: Alain Perrin, Bobigny, France

[73] Assignee: Societe Anonyme D.B.A., Paris, France

[21] Appl. No.: 701,896

[22] Filed: Feb. 15, 1985

[30] Foreign Application Priority Data

Feb. 22, 1984 [FR] France ................. 84 02653

[51] Int. Cl.[4] ............................................. B60T 8/22
[52] U.S. Cl. ................................. 303/6 C; 303/22 R
[58] Field of Search ............... 303/6 C, 6 R, 22 R, 303/24 C, 24 F

[56] References Cited

U.S. PATENT DOCUMENTS 3,709,568  1/1973  Miyake et al. ............... 303/22 R
3,892,445  7/1975  Oberthur ..................... 303/22 R
4,219,242  8/1980  Carre ....................... 303/22 R X

FOREIGN PATENT DOCUMENTS 33690  8/1981  European Pat. Off. .
2097080  10/1981  United Kingdom .

Primary Examiner—Duane A. Reger
Attorney, Agent, or Firm—Larry J. Palguta; Ken C. Decker

[57] ABSTRACT

Braking corrector of the type incorporating a simple or differential piston provided with a passage joining together the inlet and outlet chambers, a valve controlling communication through the passage, a return spring joined to a component, which is movable as a function of the vehicle load, to return the piston to a rest position, and an abutment holding the valve open in this same position. The invention provides for the corrector (10) to be provided with an elastic device (40) for limiting the travel of the piston (16) towards its rest position, this device only coming into action after the valve (24) has lifted from its seat (26) and subsequently modulating the retraction of the piston as a function of the thrust which is transmitted to it by the return spring (36). Applicable to the braking systems of motor vehicles.

5 Claims, 2 Drawing Figures

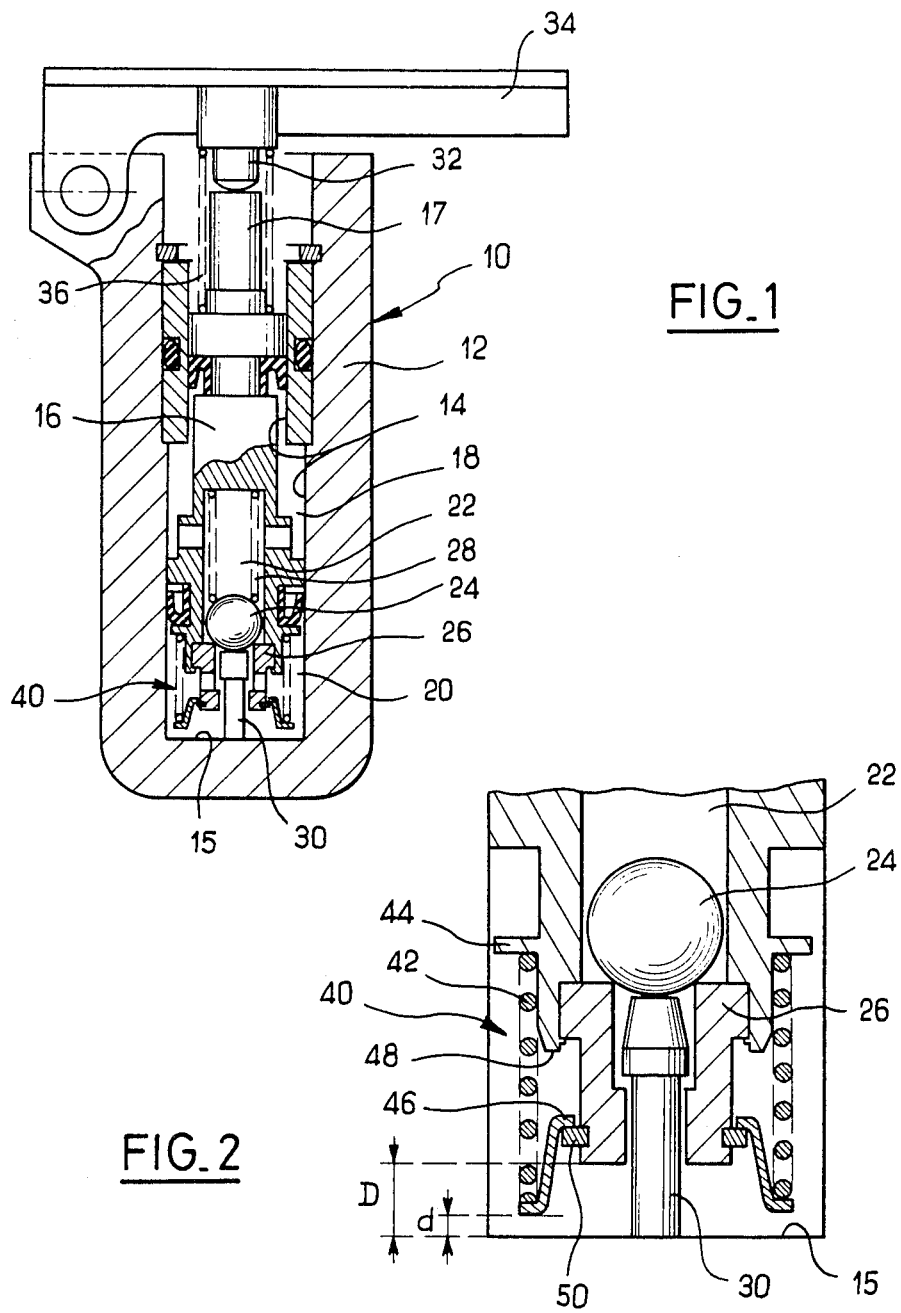
FIG_1
FIG_2

BRAKING CORRECTOR

The present invention concerns an improvement to braking correctors for motor vehicles, and particularly to correctors of the type incorporating a casing provided with a bore, a simple or differential piston sliding in the bore and defining in it first and second pressure chambers capable of being joined to a source of fluid under pressure and to one of the braking circuits of the vehicle, respectively, the chambers communicating with one another through the intermediary of a passage arranged in the piston, a valve mounted in the passage and elastically pushed in abutment so as to be sealed against a seat formed in the piston, and a return spring interposed between a movable component, whose position varies as a function of the vehicle load, and the piston so as to push the latter towards the bottom of the second chamber, in a rest position in which the valve is lifted from its seat by an abutment firmly fixed to the casing.

Such a braking corrector, more particularly called a "compensator", is particularly described, with explanations of its function and of its operation, in French Patent Application 77/07,361 filed Mar. 11, 1977 by the Applicant Company.

In a corrector of the type mentioned above, it is desirable in order to obtain correct operation of the brakes when the actuating fluid is put under pressure, to have a sufficiently large opening of the valve, that is to say sufficient lift of this valve (most often consisting of a ball) relative to its seat in the rest position of the piston. This means that sufficient travel of the piston is provided between the point where the ball comes into contact with the abutment and consequently starts to lift from its seat, and that where, under the effect of the thrust of the return spring, the piston itself comes into abutment against the bottom of the bore. This travel of the piston lies, in the rest position, in the gap arranged between the opposite end of the piston and the movable component which is positioned as a function of the vehicle load, this being so at least for the maximum value of this gap which corresponds to the lightest anticipated loads. This results, in the latter case, when the braking fluid is put under pressure, in the piston, which is pushed back by the pressure which is exerted upon it, travelling almost instantaneously along the gap compressing the weak return spring which is associated with it, and causing, when it comes into contact with the movable component, a knocking noise whose effect may be disagreeably felt by the driver of the vehicle.

The aim of the present invention is to correct this fault, and the invention proposes to this end that, in a braking corrector of the type mentioned above, an elastic device is provided for limiting the travel of the piston towards its rest position, this device only coming into action after the valve has lifted from its seat and subsequently modulating their separation as a function of the thrust exerted on the piston by the movable component representing the vehicle load and by the return spring interposed between the component and the piston.

In a preferred embodiment of the invention, the elastic device is carried by the piston at its end facing the bottom of the bore and consists of a compression spring mounted with preload between a fixed shoulder of the piston and a cup which is axially movable between two abutments formed on the piston, the outer surface of this cup only coming into contact with the bottom of the bore after the valve has lifted from its seat.

An automatic limitation of the piston travel is thus obtained as a function of the vehicle load, the lift of the valve from its seat being reduced without disadvantage when the vehicle is lightly loaded (a response of the rear brakes which is not very fast can then be easily tolerated), and the slightest gap which results from it between the free end of the piston in the rest position and the movable component representing the vehicle load then minimizes the knocking which can occur when the brake fluid is put under pressure. On the other hand, when the vehicle is heavily loaded, the movable component representing this load approaches the free end of the piston and causes the latter to be driven towards the bottom of the bore, compressing the preloaded spring of the device forming the subject of the invention and increasing the lift of the valve from its seat to give the full speed of response desired for the rear brakes.

The characteristics and advantages of the invention will emerge more clearly from the following description of a preferred embodiment applied to the case of a brake compensator, given by way of simple illustrative example, with reference to the accompanying drawings, in which:

FIG. 1 shows in elevation and partial section a brake compensator equipped with the device according to the invention, and shown in the actuating position of the brakes; and FIG. 2 shows in section diagrammatically and to a larger scale the elastic device for limiting the piston travel used in the brake compensator shown in FIG. 1.

The brake compensator 10 shown in the drawings incorporates, in a known manner, a casing 12 provided with a stepped bore 14 in which is housed so as to slide and to be sealed a differential piston 16. The latter divides the internal cavity of the bore into a first pressure chamber, called the inlet chamber 18, which is adjacent to the surface having the small cross-sectional areas of the piston 16 and can be joined to a source of fluid under pressure such as a hydraulic master cylinder of the tandem type (not shown), and a second pressure chamber, called the outlet chamber 20, which is adjacent to the surface having the large cross-sectional area of the piston 16 and can be joined to one of the braking circuits of the vehicle, in this case the circuit serving the brakes for the rear wheels (not shown). The chambers 18 and 20 communicate with one another through the intermediary of a passage 22 arranged in the piston 16, this communication being controlled by a valve consisting of a ball 24 elastically urged into sealing abutment against a seat 26 fixed to the piston, by a light spring 28 compressed in the passage 22. At rest, and as is explained below, the piston 16 is elastically pushed back towards the bottom 15 of the bore 14 and the ball 24 is then lifted from its seat 26 by an abutment 30 fixed to the casing, thus keeping open the communication between the chambers 18 and 20.

The free end 17 of the piston 16, that is to say the opposite end from that carrying the valve seat 26, faces a plunger 32 fixed to a lever 34 pivotably mounted on the casing 12, and the angular position of the lever is a function of the load carried by the rear axle of the vehicle; the greater this load, the more the lever 34, being fixed to the suspension by the intermediary of an elastic system which is not shown, is lowered thus causing the plunger 32 to approach the free end 17 of the piston 16.

Lastly, a compression spring 36 is interposed between the plunger and the piston, which functions as a return spring and tends, in the absence of any other pressure, to push back the piston 16 towards the bottom 15 of the bore, the force of this spring determining, in a manner which is well known, the position of the point of intervention of the compensator on the braking characteristic of the vehicle.

At rest, that is to say in the absence of any pressurization of the hydraulic fluid, the piston 16 is pushed back, as described above, by the return spring 36 towards the bottom 15 of the bore 14, the ball 24 is then lifted by the abutment 30 from the valve seat 26, and the free end 17 of the piston becomes separated from the plunger 32 of the pivoting lever by a certain gap whose width, itself a function of the vehicle load, equals at most (when the vehicle is empty) the separation between the ball 24 and the seat 26, which is equal to the maximum travel D of the piston 16 between the point where the ball lifts from its seat and that where the piston comes into contact with the bottom 15 of the bore. The pressures existing in the chambers 18 and 20 are then the same, being practically nil, and the brakes of the vehicle are not actuated. When the driver of the vehicle wishes to apply the brakes, the rise in fluid pressure takes place simultaneously in the two chambers until the moment when the resultant of the unequal thrusts which are exerted on the differential piston becomes sufficiently large to overcome the force of the return spring 36, and the elastic force which holds the pivoting lever 34 in the lowered position, thus causing the piston 16 to rise (and possibly also the lever 34) until the valve seat 26 comes into contact once again with the ball 24 (the operating position corresponding to that shown in the drawings). From this instant, the fluid pressure contained in the inlet chamber 18 continues to rise and results in a succession of opening/closing operations of the valve 24, 26, in such a way that the rise in pressure of the fluid contained in the outlet chamber 20 and thus in the braking circuit for the rear wheels of the vehicle takes place with a reduced rate of increase. When the driver releases the brake pedal, the pressure in the chamber 18 falls once again and the differential pressure exerted on the ball 24 changes direction, causing the valve to open and the pressures in the two chambers to be equalized, also causing the piston to return towards its rest position. The value of the inlet pressure which causes the first closing operation of the valve during an application of the brakes, or the "knee point" of the compensator which marks the change in the slope of the outlet pressure curve, naturally depends on the constructional characteristics of the piston 16 together with the force of the return spring 36; it is also influenced by the position of the pivoting lever 34, that is to say by the vehicle load, as is well known by specialists in motor vehicle braking.

It is also known that it is desirable, in order to obtain a rapid braking response, to have a wide opening of the valve in the rest position, that is to say a considerable separation between the ball 24 and the seat 26. Now this separation also exists, as indicated above, between the free end 17 of the piston 16 and the plunger 32 of the lever 34, this being so as least in the case of an empty or lightly loaded vehicle. In such a case, the piston rapidly travels the distance corresponding to the compensation of this gap for every application of the brakes, and it can result, when coming into contact with the plunger, in a "knocking" which may be disagreeable for the occupants of the vehicle.

It is to overcome this disadvantage that the invention proposes to provide the compensator with an elastic device 40 for limiting the travel of the piston towards its rest position, and a preferred embodiment of the device is shown in FIG. 2 in the drawings. It consists essentially of a compression spring 42 mounted with preload between, firstly, a fixed shoulder 44 formed close to the end of the piston 16 facing the bottom 15 of the bore, and secondly, a cup 46 which is axially movable between an abutment 48 consisting of the end of the piston itself and a stop ring 50 carried by the valve seat 26 itself firmly fixed to the piston. The shape of the cup 46 is such that, when the piston 16 occupies its position in which the valve is closed, the outer surface of this cup is only at a distance d, much smaller than the maximum possible travel D of the piston, from the bottom 15 of the bore; in order to move through this maximum travel D, the pressure exerted on the piston must thus be sufficient to make the cup 46 retract compressing the spring 42, the force of which should be chosen to be greater than that developed by the return spring 36 in its position of maximum elongation corresponding to the lightest vehicle loads. As a result, in the case of an unladen or lightly loaded vehicle, the piston 16 will only retract by the value d during its return to the rest position following a braking application; the gap between the free end 17 of the piston and the associated plunger 32 will thus itself be limited to the value d, thus avoiding an undesirable knocking during a subsequent braking application; on the other hand only a slight separation is obtained between the ball 24 and its seat 26, but it is known that in such a case a rapid response of the rear brakes of the vehicle is of little importance. Conversely, when the vehicle is subjected to a considerable load, the lowering of the lever 34 and the compression of the return spring 36 cause a greater or lesser compression of the spring 42 and hence an increased retraction of the piston 16 which, at the limit of permitted load, may reach the value D corresponding to the valve seat 26 coming into contact with the bottom 15 of the bore; in such a case the valve is open as wide as is desirable without the risk of a knocking reappearing during a new braking application, as in such a case the gap between the plunger and the piston is reduced anyway, or even nil. The elastic device of the invention, which only comes into action once the valve has lifted from its seat by the piston returning towards its rest position and consequently does not influence in any way the operation of the compensator during braking applications, thus has the effect of modulating the retraction of the piston as a function of the effective load on the vehicle; in this way it allows the disadvantage mentioned above to be eliminated without detracting from the expected performance of the compensator.

Although the invention is described above in the particular case of application to a braking compensator, it should be understood that it can be equally applied with the same advantages to the case of a pressure limiter equipped with a simple piston, so that its field of use covers braking correctors in the broad sense of the term.

I claim:

1. A braking corrector capable of being interposed between a source of hydraulic pressure and a braking circuit of a motor vehicle, comprising a casing provided with a bore, a differential piston sliding in the bore and defining therein first and second pressure chambers capable of being joined to the pressure source and to the braking circuit, respectively, the pressure chambers communicating with one another by means of a passage in the piston, a valve mounted in the passage and elastically pushed by spring means into sealing abutment with a seat formed in the piston, and a return spring interposed between a movable component whose position varies as a function of vehicle load and the piston so as to push the piston toward a bottom portion of the second pressure chamber and a rest position in which the valve is separated from the seat by an abutment fixed firmly to the casing, characterized in that the corrector further comprises resilient means for limiting travel of the piston toward the rest position, the resilient means disposed between the piston and bottom portion and becoming operative after the valve has separated from the seat to subsequently modulate the separation as a function of thrust exerted on the piston by the movable component which represents vehicle load and by the return spring interposed between the component and piston.

2. The braking corrector according to claim 1, characterized in that the resilient means is carried by the piston at an end facing the bottom portion and comprises a compression spring mounted with a preload force between a fixed shoulder of the piston and a movable portion comprising a cup axially movable between two abutments formed on the piston, an outer surface of the cup coming into contact with the bottom portion after the valve has separated from the seat.

3. The braking corrector according to claim 2, characterized in that the preload force of the compression spring is greater than that of the return spring in the return spring's position of maximum elongation corresponding to lightest loading of the vehicle.

4. The braking corrector according to claim 3, characterized in that the valve comprises a ball valve which engages an annular opening forming the seat of the piston.

5. The braking corrector according to claim 4, characterized in that the abutment extends into the passage in the piston to effect said separation, the abutment, resilient means, and movable portion aligned coaxially.

* * * * *